US012034848B2

(12) United States Patent
Daley et al.

(10) Patent No.: US 12,034,848 B2
(45) Date of Patent: *Jul. 9, 2024

(54) DEVICE-RELATIONSHIP BASED COMMUNICATION

(71) Applicant: Apple Inc., Cupertino, CA (US)

(72) Inventors: Andrew J. Daley, Santa Clara, CA (US); Nicholas J. Circosta, Mountain View, CA (US); Ryan W. Baker, Mountain View, CA (US); Elliot T. Garner, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/732,374

(22) Filed: Apr. 28, 2022

(65) Prior Publication Data

US 2022/0255740 A1 Aug. 11, 2022

Related U.S. Application Data

(63) Continuation of application No. 16/888,432, filed on May 29, 2020, now Pat. No. 11,349,657.

(Continued)

(51) Int. Cl.
*H04L 9/32* (2006.01)
*H04L 9/30* (2006.01)
(Continued)

(52) U.S. Cl.
CPC ............... *H04L 9/30* (2013.01); *H04L 63/10* (2013.01); *H04W 12/04* (2013.01); *H04W 12/64* (2021.01); *H04W 76/14* (2018.02)

(58) Field of Classification Search
CPC .......... H04L 9/30; H04L 63/10; H04W 76/14; H04W 12/64; H04W 12/04
(Continued)

(56) References Cited

U.S. PATENT DOCUMENTS

2013/0343542 A1* 12/2013 Rosati ................. H04L 63/0492
380/270
2014/0122880 A1 5/2014 Krishnaswamy
(Continued)

FOREIGN PATENT DOCUMENTS

CN 105704645 A 6/2016
EP 2680526 1/2014

OTHER PUBLICATIONS

International Search Report and Written Opinion from PCT/US2020/035417, dated Sep. 14, 2020, 13 pages.
(Continued)

*Primary Examiner* — Brandon Hoffman
*Assistant Examiner* — Samuel Ambaye
(74) *Attorney, Agent, or Firm* — BAKERHOSTETLER

(57) ABSTRACT

A device implementing a system for device-relationship based communication includes at least one processor configured to establish, by a first device associated with a first user, a secure communication channel with a second device associated with a second user via a direct wireless connection. The at least one processor is configured to transmit, over the secure communication channel, first device-identifying information to the second device, and receive, over the secure communication channel, second device-identifying information from the second device. The at least one processor is configured to establish a particular type of relationship with the second device, store the second device-identifying information in association with an indication of the particular type of relationship established with the second device, and transmit, to the second device and over the secure communication channel, the indication of the particular type of relationship established with the second device.

21 Claims, 5 Drawing Sheets

Related U.S. Application Data

(60) Provisional application No. 62/855,844, filed on May 31, 2019.

(51) Int. Cl.
    *H04L 9/40*      (2022.01)
    *H04W 12/04*     (2021.01)
    *H04W 12/64*     (2021.01)
    *H04W 76/14*     (2018.01)

(58) Field of Classification Search
    USPC .......................................................... 713/171
    See application file for complete search history.

(56) References Cited

U.S. PATENT DOCUMENTS

| | | | |
|---|---|---|---|
| 2015/0248389 A1* | 9/2015 | Kahn | H04L 51/18 |
| | | | 715/230 |
| 2016/0352524 A1 | 12/2016 | Kinney et al. | |
| 2020/0053612 A1* | 2/2020 | Jorgovanovic | H04W 76/15 |
| 2020/0228520 A1* | 7/2020 | Thampi | H04W 4/80 |

OTHER PUBLICATIONS

Chinese Office Action from Chinese Patent Application No. 202080037595.1, dated Feb. 27, 2024, 19 pages including machine-generated English language translation.

\* cited by examiner

DEVICE-RELATIONSHIP BASED COMMUNICATION

CROSS REFERENCE TO RELATED APPLICATIONS

This application is a continuation of U.S. patent application Ser. No. 16/888,432, entitled "Device-Relationship Based Communication", filed May 29, 2020, which claims the benefit of priority to U.S. Provisional Patent Application No. 62/855,844, entitled "Device-Relationship Based Communication," and filed on May 31, 2019, the disclosure of each of which is hereby incorporated by reference herein in its entirety.

TECHNICAL FIELD

The present description relates generally to communication between two electronic devices, and more particularly, trust based communication based on a relationship established between the electronic devices.

BACKGROUND

With the growth of mobile computing devices, the likelihood of receiving messages from unknown mobile computing devices and/or users also increases. A user of a mobile computing device may be exposed to risk from messages from the unknown mobile computing devices and/or users. Additionally, existing tools fail to provide a user from limiting access to certain application services to a set of users.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

The subject system provides for trust based communication between two devices associated with two different user accounts based on a relationship established between the devices, e.g., via a secure direct wireless channel. In one or more implementations, the relationship established between the devices may correspond to, for example, a relationship between the users of the devices, such as a parent/guardian-child relationship. For example, implementations described herein provide for a trust based relationship to be established between two devices by exchanging device-identifying information (e.g., device-identifying tokens or other device-identifying information) and/or keys uniquely associated with each device, such as over the secure direct wireless channel. The exchanged device-identifying information can subsequently be used to specifically address messages to the other device, and also to verify that a received message was transmitted by the other device, while the keys can subsequently be used to encrypt/decrypt and/or verify messages communicated between the devices.

Figure 1:
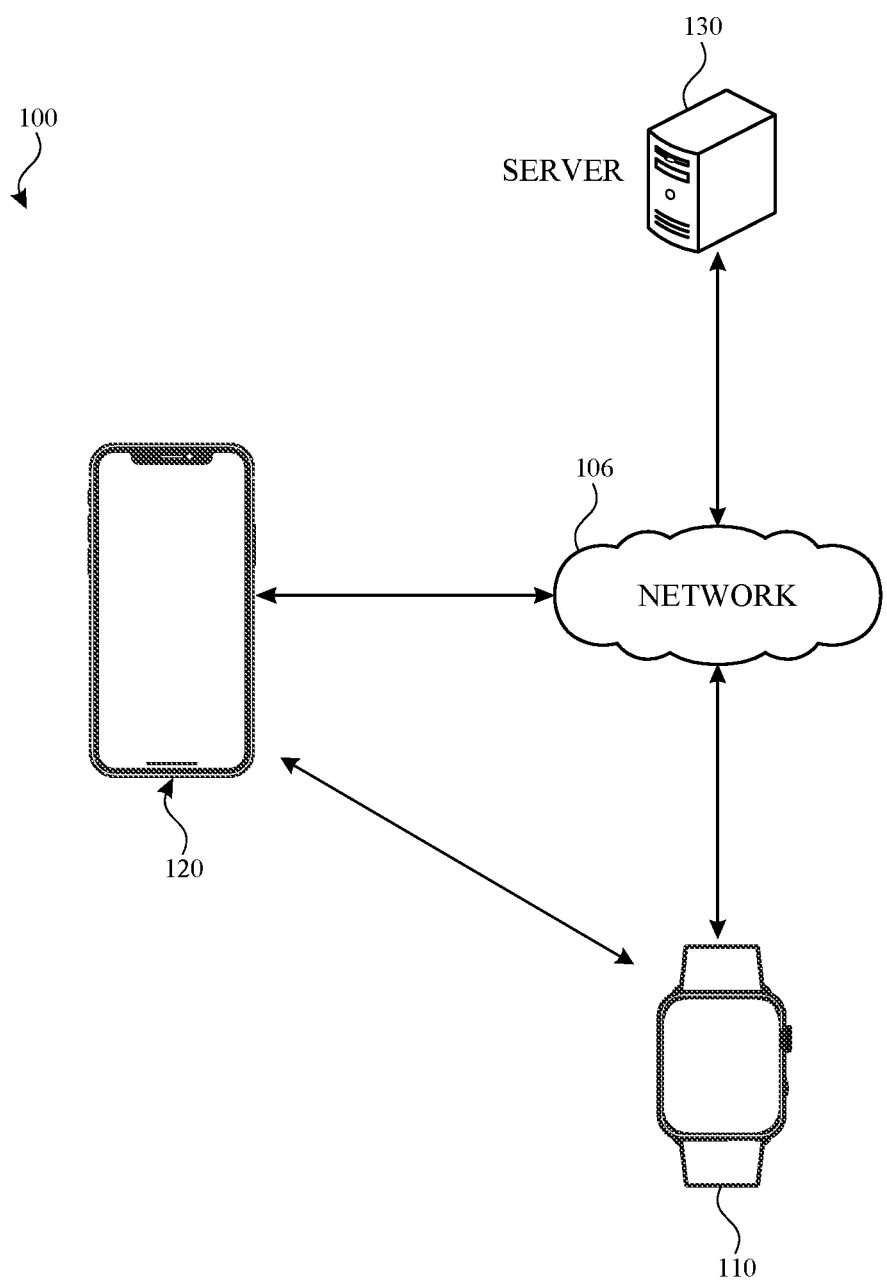
FIG. 1 illustrates an example network environment for providing device-relationship based communication in accordance with one or more implementations.

FIG. 1 illustrates an example network environment 100 for providing device-relationship based communication in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 120, an electronic device 110, and a server 130. The network 106 may communicatively (directly or indirectly) couple, for example, any two or more of the electronic devices 110, 120, and/or the server 130. In one or more implementations, the network 106 may be an interconnected network of devices that may include, or may be communicatively coupled to, the Internet. For explanatory purposes, the network environment 100 is illustrated in FIG. 1 as including the electronic devices 110, 120, and the server 130; however, the network environment 100 may include any number of electronic devices and any number of servers.

In one or more implementations, the server 130 may be part of a network of computers or a group of servers, such as in a cloud computing or data center implementation. The server 130 may correspond to a service provider that provides one or more services, such as a messaging service, to the electronic devices 110, 120. The electronic devices 110, 120 may be registered to (and/or associated with) a user account with the service provider via the server 130. For example, the electronic device 110 may be associated with a first user account and the electronic device 120 may be associated with a second, different, user account. In one or more implementations, both of the electronic devices 110, 120 may be associated with the same user account.

The server 130 may store device-identifying information, such as tokens, that uniquely identify electronic devices registered with the service provider, and the server 130 may provide an electronic device with its device-identifying information, e.g., at the time of registration. The device-identifying information may be used by the server 130, for example, to route messages between the electronic devices.

In some implementations, the server 130 may be configured to add the device-identifying information (e.g., a token) associated with a sender device to a message received from the sender device that is being routed to a recipient device. The recipient device may then receive the message and verify the sender, for example, based on the device-identifying information. In some implementations, the server 130 may be configured to store the device-identifying information (e.g., tokens) corresponding to a given user's electronic devices in association with one or more user identifiers of the user (e.g., phone number, email identifier, and the like), and, based on the association, include the identified routing token in the message to the recipient device.

The electronic devices 110 and 120 may be, for example, portable computing devices and/or wearable computing devices such as a laptop computer, a smartphone, a smart watch, a tablet device, a smart speaker, and the like, or any other appropriate device that includes, for example, one or more wireless interfaces, such as WLAN radios, cellular radios, Bluetooth radios, Zigbee radios, near field communication (NFC) radios, and/or other wireless radios. In FIG. 1, by way of example, the electronic device 120 is depicted as a mobile smartphone device, and the electronic device 110 is depicted as a smart watch, e.g., a wearable electronic device. The electronic devices 110 and 120 may be, and/or may include all or part of, the electronic devices discussed below with respect to FIG. 2 and/or electronic system discussed below with respect to FIG. 5.

A user of an electronic device, such as the electronic device 120, may configure the electronic device 120 to establish a particular type of relationship between the electronic device 120 and a second electronic device, such as the electronic device 110. In one or more implementations, the particular type of relationship between the electronic devices 110, 120 may be based on a type of relationship between the users of the respective electronic devices 110, 120. The type of relationship between the users may be, for example, a parent/guardian-child relationship, a caretaker/caregiver-patient relationship, a teacher-student relationship, or generally any relationship that two or more users may have with one another.

The establishment of the particular type of relationship between the electronic devices 110, 120 may include exchanging device-identifying information (e.g., tokens) and/or keys (e.g., symmetric keys and/or public-private key pairs) over a secure direct wireless connection, where the device-identifying tokens can later be used to address messages directly to the other electronic device (and/or confirm that a received message was transmitted by the other electronic device) and the keys can later be used to verify and/or encrypt messages transmitted by the other electronic device. An example process or establishing a particular type of relationship between the electronic devices 110, 120 is discussed further below with respect to FIG. 3.

Based on the established device-relationships, the users of the electronic devices 110, 120 may communicate with each other's electronic devices 110, 120 by specifying the type of relationship established between the electronic devices 110, 120, e.g., rather than using an identifier associated with the user of the other electronic device. For example, a parent who has established a parent-child relationship between their electronic device 120 and the electronic devices 110 of their children may be able to transmit a message to the electronic devices 110 of their children by requesting to send a message to all of the electronic devices 110 with which the parent-child type relationship has been established. The electronic device 120 can then retrieve the device-identifying information that is stored in association with a parent-child relationship and use the device-identifying information to transmit messages to the electronic devices for which a parent-child relationship was established by the electronic device 120.

For example, if the user of the electronic device 120 has established relationships with three electronic devices, one with a relationship type of caregiver-patient and two with a relationship type of parent-child, then the electronic device 120 may display the two relationship types to the user of electronic device 120 in response to the user selecting an option to transmit a message. If the user selects the relationship type parent-child, then the electronic device 120 transmits the message to the electronic device(s) for which the electronic device 120 has established the relationship type parent-child, e.g., based on the device-identifying information stored in association with the parent-child relationship type.

In one or more implementations, the electronic device 120 may determine whether an incoming message is from an electronic device associated with a trusted relationship, and grant access to a requested application service and/or display the message based on the device-identifying information included in the received message. For example, the electronic device 120 may determine whether the message from the electronic device 110 is from an electronic device associated with a trusted relationship based on a comparison of the device-identifying information received from the electronic device 110 when the relationship was established and the device-identifying information included in the received message. An example device-relationship based communication is discussed further below with respect to FIG. 4.

Figure 2:
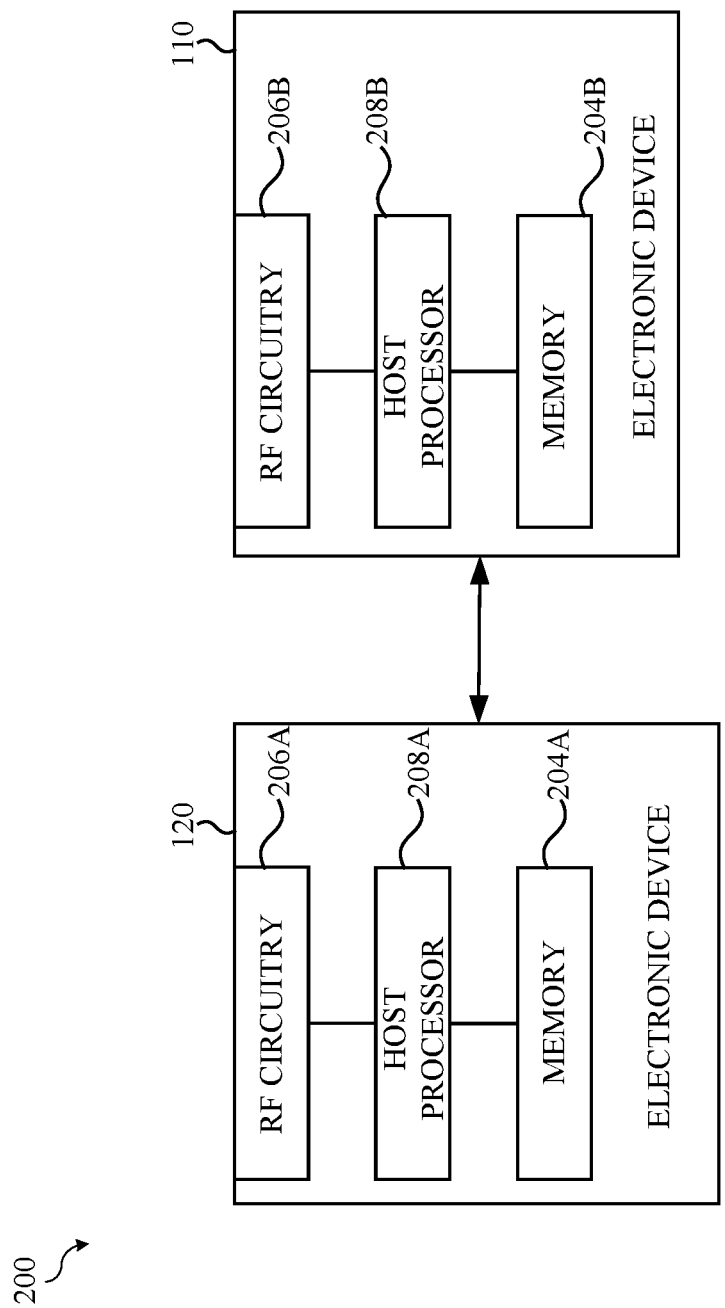
FIG. 2 illustrates an example peer-to-peer network environment for establishing device-relationship based communication, in accordance with one or more implementations.

FIG. 2 illustrates an example peer-to-peer network environment 200 including the example electronic device 120 and the example electronic device 110, in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 110 may include a host processor 208A, a memory 204A, and radio frequency (RF) circuitry 206A. The electronic device 120 may include a host processor 208B, a memory 204B, and an RF circuitry 206B.

The RF circuitry 206A-B may include one or more antennas and one or more transceivers for forming wide area network wireless connections and peer-to-peer, e.g., direct, wireless connections, such as WiFi, Bluetooth, NFC, and/or cellular circuitry. The host processors 208A-B may include suitable logic, circuitry, and/or code that enable processing data and/or controlling operations of the electronic device 110 and the electronic device 120, respectively. In this regard, the host processors 208A-B may be enabled to provide control signals to various other components of the electronic device 110 and the electronic device 120, respectively. Additionally, the host processors 208A-B may enable implementation of an operating system or otherwise execute code to manage operations of the electronic device 110 and the electronic device 120, respectively.

The memories 204A-B may include suitable logic, circuitry, and/or code that enable storage of various types of information such as received data, generated data, code, and/or configuration information. The memories 204A-B may include, for example, random access memory (RAM), read-only memory (ROM), flash, and/or magnetic storage.

As noted above, the electronic device 120 may be a mobile phone, a tablet, or any other type of hand-held device, a media player, a computer, a laptop or virtually any type of wireless device. The electronic device 110 may be any of various types of devices that, in some implementations, have a smaller form factor relative to a conventional smart phone, and may have one or more of limited communication capabilities, limited display space, limited output power, or limited battery life relative to a conventional smart phone. In some implementations, the electronic device 110 may be a smart watch or other type of wearable device.

The peer-to-peer network environment 200 may facilitate establishing a direct wireless connection between the electronic devices 110, 120, over which a secure communication channel may be established. For example, when the electronic devices 110, 120 are within a certain proximity of each other, (e.g., a threshold distance), the electronic devices 110, 120 may establish a secure, e.g., encrypted, communication channel via one or more wireless technologies, such as Bluetooth, NFC, Wi-Fi Aware, or generally any wireless technology. The electronic devices 110, 120 may secure the communication channel using, for example, a link key, a session key, securely exchanged public keys of public-private keypairs, and the like.

Once the secure communication channel is established, the electronic devices 110, 120 may establish a device-relationship that may include securely exchanging device-identifying information and/or keys (e.g. symmetric keys, public keys, and the like) over the secure communication channel. In one or more implementations, if the electronic devices 110, 120 move out of the threshold distance from one another, the secure communication channel may be terminated, e.g., even if the wireless technology being used to provide the secure communication channel supports the increased distance between the electronic devices 110, 120.

In one or more implementations, one or more of the host processors 208A-B, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
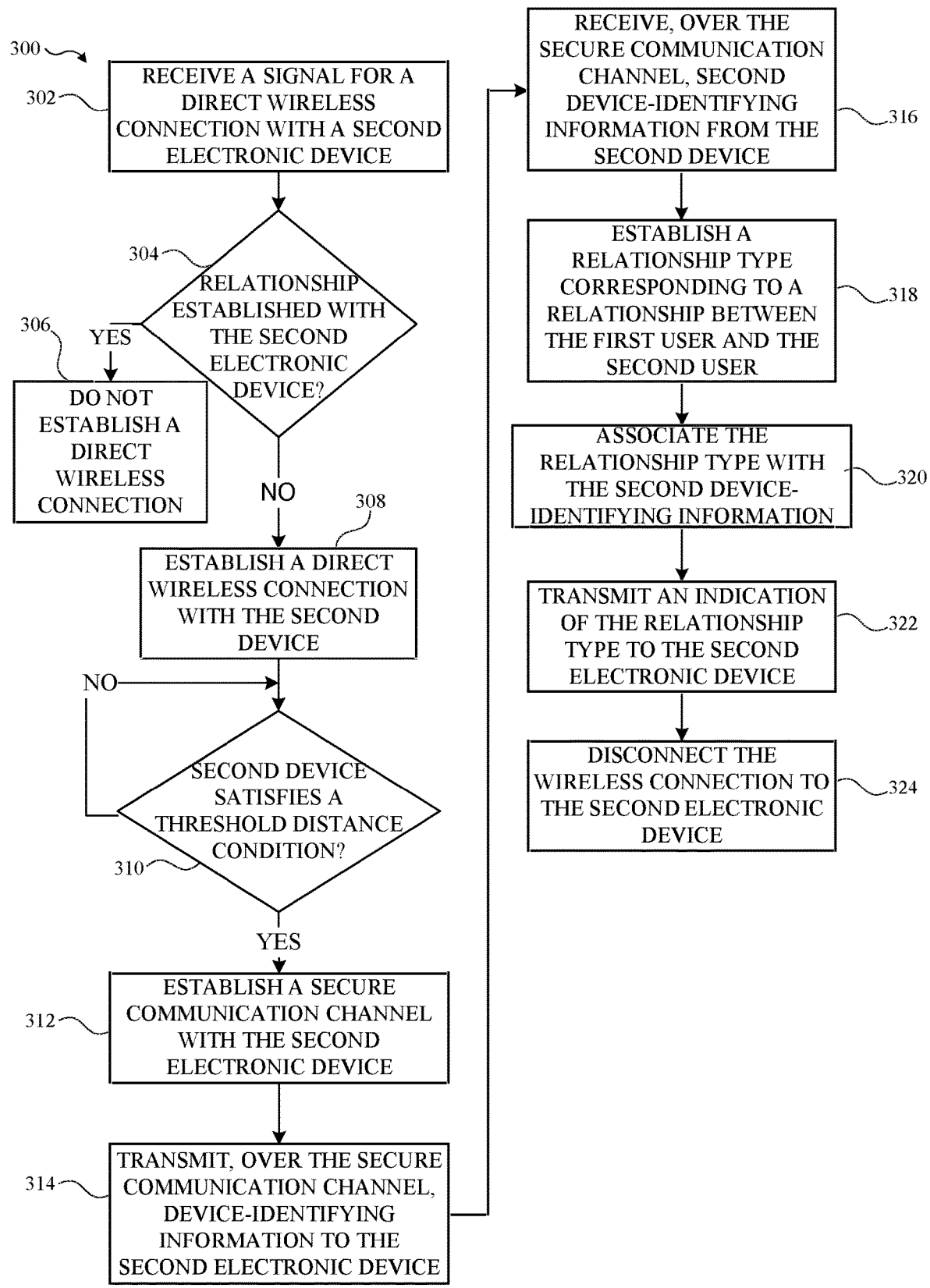
FIG. 3 illustrates a flow diagram of an example process for establishing a relationship between electronic devices associated with two different users in accordance with one or more implementations.

FIG. 3 illustrates a flow diagram of an example process 300 for establishing a relationship between electronic devices associated with two different users in accordance with one or more implementations. For explanatory purposes, the process 300 is primarily described herein with reference to the electronic devices 110, 120 of FIGS. 1-2. However, the electronic devices 110, 120 are presented as exemplary devices and the operations described herein may be performed by any suitable devices. Further for explanatory purposes, the operations of the process 300 are described herein as occurring in serial, or linearly. However, multiple operations of the process 300 may occur in parallel or at least partially overlap. In addition, the operations of the process 300 need not be performed in the order shown and/or one or more of the operations of the process 300 need not be performed and/or can be replaced by other operations.

The example process 300 begins when an electronic device, such as the electronic device 120, receives a signal for a direct wireless connection with a second electronic device 110 (302). For example, the electronic device 120 may receive an advertisement for a Bluetooth wireless connection from electronic device 110 to establish a direct wireless connection with the electronic device 110. In one or more implementations, the example process 300 may be performed when the electronic device 110 is first configured for a particular user, and/or is being configured for a new user.

In response to receiving the signal for a direct wireless connection with the second electronic device 110, the electronic device 120 may determine whether a relationship is established with the second electronic device (304). Based on a list of stored associations between device identifiers/device-identifying information and relationship types, the electronic device 120 may determine whether a relationship is established between the second electronic device 110 and the electronic device 120.

For example, for each electronic device with which a relationship is established, the electronic device 120 may store an identifier of the electronic device and/or device-identifying information in association with an indication of a relationship between that electronic device and the electronic device 120. For example, if a relationship as a parent-child is established between the electronic device 120 and the electronic device 110, then the electronic device 120 stores an identifier of the electronic device 110 (e.g., a MAC address, a Bluetooth address, etc.) in association with the relationship type "child." The electronic device 120 may store the association in a storage unit of the electronic device 120 and/or a storage unit communicatively coupled to the electronic device 120.

If the electronic device 120 determines that a relationship with the second electronic device 110 previously established, then the electronic device 120 does not establish a direct wireless connection with the second electronic device 110 (306). If the electronic device 120 determines that the relationship is not established with the second electronic device 110, then the electronic device 120 establishes a direct wireless connection with the second electronic device 110 (308). The electronic device 120 determines whether the second electronic device 110 satisfies a threshold distance condition (310). The threshold distance condition may be specified as a maximum distance between the electronic device 120 and the second electronic device 110 (e.g., less than 10 centimeters, less than 1 meter, less than 10 meters, or generally any proximate distance away).

In some implementations, the electronic device 120 may determine whether the second electronic device 110 is within the threshold distance based on a strength of the direct wireless connection signal between the electronic device 120 and the second electronic device 110. For example, if the electronic device 120 is directly connected to the electronic device 110 via a Bluetooth wireless connection, then the electronic device 120 may determine a value corresponding to a certain distance using an indicator of strength of a Bluetooth signal from the electronic device 110, and based on the determined value, the electronic device 120 may determine whether the electronic device 110 satisfies the threshold distance condition. In one or more implementations, the electronic device 120 may utilize ranging, e.g. ultrawideband ranging, to determine the proximity of the electronic device 110.

If the electronic device 120 determines that the second electronic device 110 does not satisfy the threshold distance condition, then the electronic device 120 may be configured to periodically determine whether the second electronic device 110 satisfies the threshold distance condition. In some implementations, the electronic device 120 may initiate a timer and periodically determine whether the second electronic device satisfies the threshold distance condition until the timer satisfies a threshold value (e.g., timer expires). In such implementations, if the electronic device 120 determines that the timer satisfies the threshold value before the second electronic device 110 satisfies the threshold distance condition, then the electronic device 120 may terminate the process 300.

If the electronic device 120 determines that the second electronic device 110 satisfies the threshold distance condition, then the electronic device 120 establishes a secure communication channel with the second electronic device 110 over the direct wireless connection (312). In one or more implementations, the secure communication channel may be different from, and/or independent of, a primary communication channel of a wireless connection between the electronic device 120 and the second electronic device. For example, the secure communication channel may be over a different radio frequency band and/or using a different communication radio of the electronic device 120 than the primary communication channel. For example, the electronic device 120 connected to the electronic device 110 via Bluetooth may pair with electronic device 110 using out-of-band pairing protocol, and the electronic devices 120, 110 communicate via the out-of-band communication channel.

The electronic device 120 transmits over the secure communication channel device-identifying information, such as a token, to the second electronic device 110 (314). The device-identifying information may be uniquely associated with the electronic device 120. The electronic device 120 may receive second device-identifying information, such as a token, over the secure communication channel from the second electronic device 110 (316). The device-identifying information received from the second electronic device 110 may be uniquely associated with the second electronic device 110.

In one or more implementations, the electronic devices 110, 120 may exchange one or more keys over the secure communication channel, e.g., in addition to, or in lieu of, exchanging the device-identifying information. The one or more keys may include, for example, a symmetric key, a public key of a public-private key pair, and the like.

The electronic device 120 may establish a particular relationship type with the second electronic device 110, such as a relationship type corresponding to a relationship between the users of the electronic devices 110, 120 (318). In one or more implementations, the electronic device 120 may establish the particular relationship type based on a user input indicating the particular type of relationship to be established between the electronic devices 110, 120.

In some implementations, the electronic device 120 may provide, for display, one or more potential relationships (e.g., parent, caretaker, child, grandchild, brother, sister, friend, and the like) between the user of the electronic device 120 and the user of the second electronic device 110. The electronic device 120 may receive a selection of a relationship corresponding to, for example, the relationship between the respective users of the electronic devices 110, 120. Based on the selected relationship, the electronic device 120 may determine a particular relationship type to be established between the electronic devices 110, 120. For example, if a user of the electronic device 120 selects the relationship "child," then the electronic device 120 may determine the particular relationship type between the electronic device 120 and the second electronic device 110 as parent-child.

The electronic device 120 associates the relationship type with the device-identifying information (and/or keys) received from the second electronic device 110 (320). The electronic device 120 may store the association between the relationship type and the key from the second electronic device 110 in a secure storage unit included in the electronic device 120 and/or communicatively coupled to the electronic device 120.

The electronic device 120 transmits an indication of the particular relationship type to the second electronic device 110 (322). The electronic device 120 may transmit the relationship type to the second electronic device 110 via a message to the second electronic device over the secure communication channel. The electronic device 120 disconnects wireless connection to the second electronic device (324).

Figure 4:
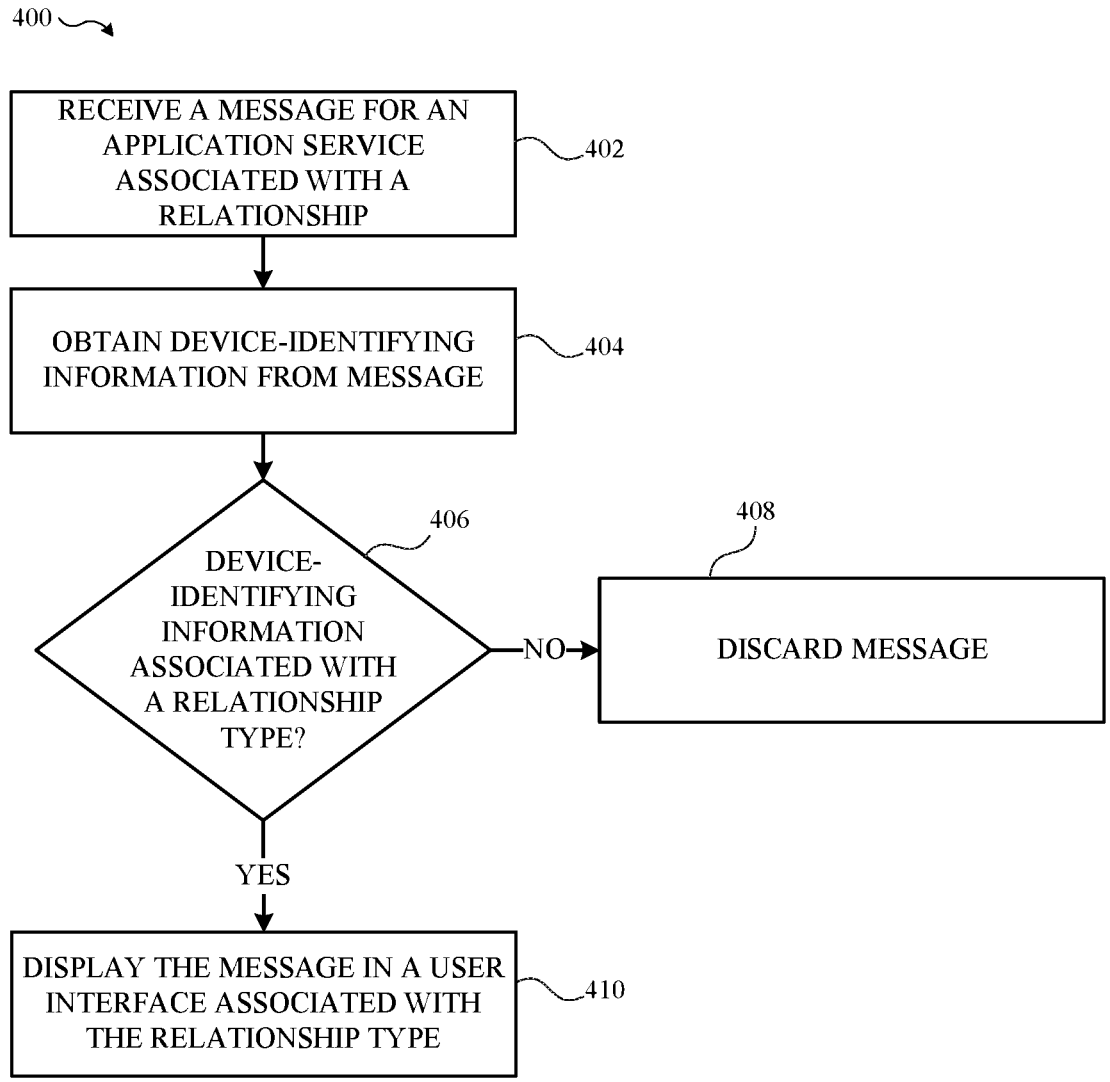
FIG. 4 illustrates a flow diagram of an example process for a device-relationship based communication in accordance with one or more implementations.

FIG. 4 illustrates a flow diagram of an example process 400 for a device-relationship based communication in accordance with one or more implementations. For explanatory purposes, the process 400 is primarily described herein with reference to the electronic device 120 of FIG. 1. However, the electronic device 120 is presented as an exemplary device and the operations described herein may be performed by any suitable devices, such as the electronic device 110. Further for explanatory purposes, the operations of the process 300 are described herein as occurring in serial, or linearly. However, multiple operations of the process 300 may occur in parallel or at least partially overlap. In addition, the operations of the process 300 need not be performed in the order shown and/or one or more of the operations of the process 300 need not be performed and/or can be replaced by other operations.

The example process 400 begins when the electronic device 120 receives a message for a relationship based application service (402), such as from the server 130. A relationship based application service may be a service provided by, and/or facilitated by, the server 130 that is accessible by only the devices with which the electronic device 120 has established a relationship. In some implementations, the electronic device 120 may determine whether an application service is a relationship based application service based on a namespace associated with the application service. For example, if the namespace of relationship based application services is "relationship.<application name>," then the electronic device 120 may determine that the application service is for a relationship based application service. In one or more implementations, the electronic device 120 may receive the message from any service, such as a general messaging service.

The electronic device 120 obtains device-identifying information, such as a token, from the message (404). In some implementations, a sender device may transmit a message to the electronic device 120 via a server computing device, such as the server 130, and the server computing device may be configured to append the device-identifying information associated with sender device in the message to the recipient device. In some implementations, the sender device may include the device-identifying information in the transmitted message.

The electronic device 120 determines if the device-identifying information included in the received message is associated with a relationship type (406). As described above, if a relationship type is established with an electronic device 110, then the device-identifying information of the electronic device 110 is stored in association with the relationship type. Thus, the electronic device 120 can determine if the device-identifying information included in the received message is associated with the relationship type based on the stored associations.

If the electronic device 120 determines that the device-identifying information included in the received message is not associated with a relationship type, then the electronic device 120 discards the message (408). If the electronic device 120 determines that the device-identifying information included in the received message is associated with a relationship type, then the electronic device 120 displays message in a user interface associated with the relationship type (410). In some implementations, the user interface may be a user interface associated with application service.

In one or more implementations, if the electronic devices 110, 120 exchanged one or more keys over the secure communication channel when establishing the relationship, the electronic device 120 may use a key that was exchanged when establishing the relationship to decrypt the contents of the message and/or to verify a signature of the message. For example, the contents of the message may have been encrypted by the electronic device 110 using a public key of the electronic device 120 (which can be decrypted using the locally stored corresponding private key), and/or the message may be signed with a signing key and/or a private key of the electronic device 110, where the corresponding public key was provided to the electronic device 120 when the relationship was established.

Figure 5:
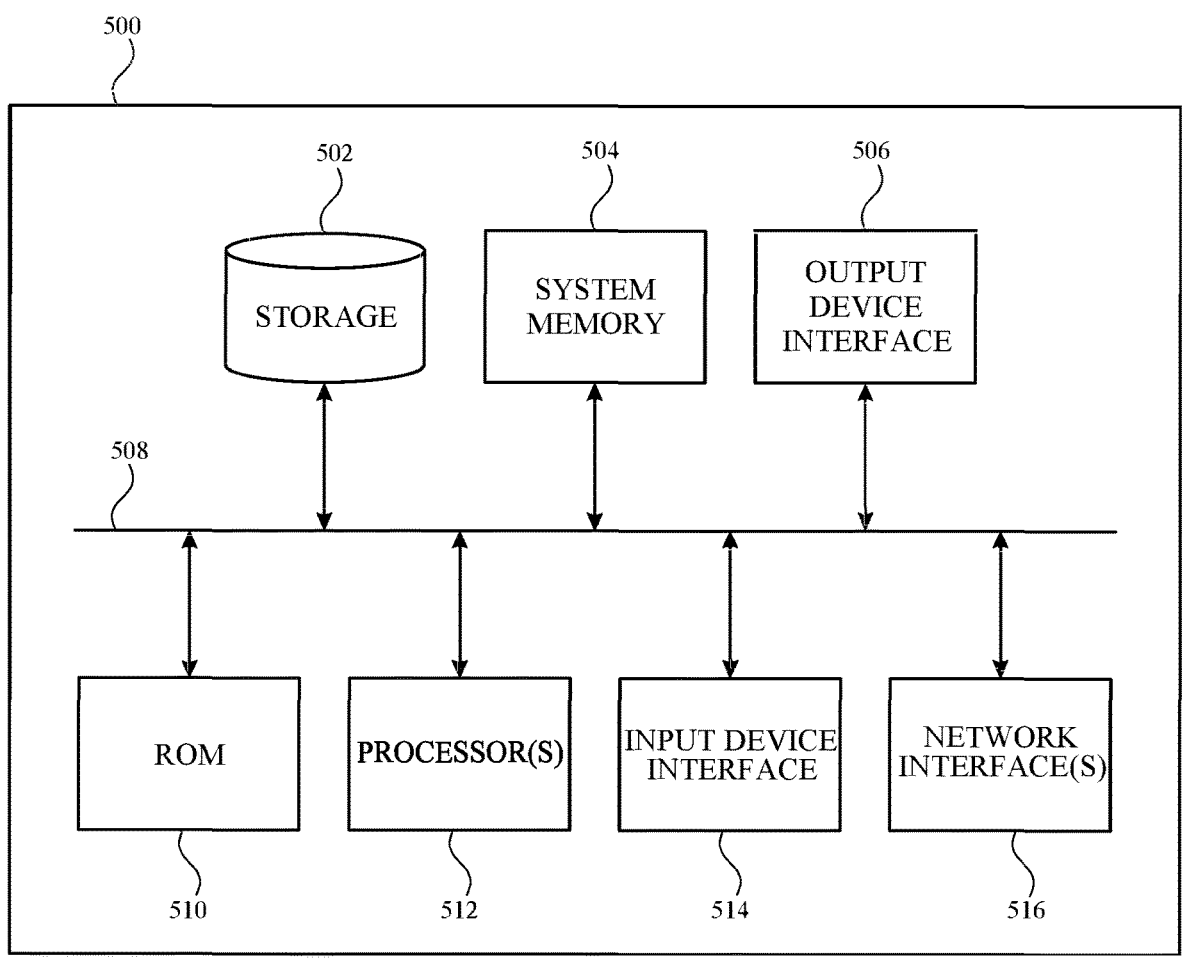
FIG. 5 illustrates an electronic system with which one or more implementations of the subject technology may be implemented.

FIG. 5 illustrates an example electronic system 500 with which aspects of the subject technology may be implemented in accordance with one or more implementations. The electronic system 500 may include various types of computer readable media and interfaces for various other types of computer readable media. The electronic system 500 includes a bus 508, one or more processing unit(s) 512, a system memory 504 (and/or buffer), a ROM 510, a permanent storage device 502, an input device interface 514, an output device interface 506, and one or more network interfaces 516, or subsets and variations thereof.

The bus 508 collectively represents all system, peripheral, and chipset buses that communicatively connect the numerous internal devices of the electronic system 500. In one or more implementations, the bus 508 communicatively connects the one or more processing unit(s) 512 with the ROM 510, the system memory 504, and the permanent storage device 502. From these various memory units, the one or more processing unit(s) 512 retrieves instructions to execute and data to process in order to execute the processes of the subject disclosure. The one or more processing unit(s) 512 can be a single processor or a multi-core processor in different implementations.

The ROM 510 stores static data and instructions that are needed by the one or more processing unit(s) 512 and other modules of the electronic system 500. The permanent storage device 502, on the other hand, may be a read-and-write memory device. The permanent storage device 502 may be a non-volatile memory unit that stores instructions and data even when the electronic system 500 is off. In one or more implementations, a mass-storage device (such as a magnetic or optical disk and its corresponding disk drive) may be used as the permanent storage device 502.

In one or more implementations, a removable storage device (such as a floppy disk, flash drive, and its corresponding disk drive) may be used as the permanent storage device 502. Like the permanent storage device 502, the system memory 504 may be a read-and-write memory device. However, unlike the permanent storage device 502, the system memory 504 may be a volatile read-and-write memory, such as random access memory. The system memory 504 may store any of the instructions and data that one or more processing unit(s) 512 may need at runtime. In one or more implementations, the processes of the subject disclosure are stored in the system memory 504, the permanent storage device 502, and/or the ROM 510. From these various memory units, the one or more processing unit(s) 512 retrieves instructions to execute and data to process in order to execute the processes of one or more implementations.

The bus 508 also connects to the input and output device interfaces 514 and 506. The input device interface 514 enables a user to communicate information and select commands to the electronic system 500. Input devices that may be used with the input device interface 514 may include, for example, alphanumeric keyboards and pointing devices (also called "cursor control devices"). The output device interface 506 may enable, for example, the display of images generated by electronic system 500. Output devices that may be used with the output device interface 506 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 5, the bus 508 also couples the electronic system 500 to one or more networks and/or to one or more network nodes, through the one or more network interface(s) 516. In this manner, the electronic system 500 can be a part of a network of computers (such as a LAN, a wide area network ("WAN"), or an Intranet, or a network of networks, such as the Internet. Any or all components of the electronic system 500 can be used in conjunction with the subject disclosure.

As described above, one aspect of the present technology is the gathering and use of data available from specific and legitimate sources to improve trust based communication between two electronic devices. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to determine various possible relationships to establish a relationship type between two electronic devices in accordance with a user's preferences. Accordingly, use of such personal information data enables users to have greater control of the devices for which a relationship type is established and the type of relationship established. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of establishing a relationship type with an electronic device, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, one or more potential relationships can be determined based on aggregated non-personal information data or a bare minimum amount of personal information, such as the information being handled only on the user's device or other non-personal information available.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
   establishing, by a first device associated with a first user, a secure communication channel with a second device associated with a second user;
   transmitting, by the first device, over the secure communication channel, first device-identifying information to the second device, and receiving, over the secure communication channel, second device-identifying information from the second device;
   receiving, a message from the second device, wherein the message comprises device-identifying information corresponding to the second device;
   verifying, by the first device, the message based at least in part on a comparison of the device-identifying information included in the message with the second device-identifying information received from the second device over the secure communication channel; and
   in response to verifying the message, causing at least a portion of the message to be displayed on the first device.

2. The method of claim 1, wherein the first device-identifying information comprises a first token and the second device-identifying information comprises a second token.

3. The method of claim 1, further comprising:
transmitting, by the first device, over the secure communication channel, a first public key to the second device, and receiving, over the secure communication channel, a second public key from the second device.

4. The method of claim 1, wherein establishing, by the first device associated with the first user, the secure communication channel with the second device associated with the second user comprises:
connecting, by the first device, to the second device via a direct wireless connection;
in response to connecting to the second device via the direct wireless connection, determining, by the first device, whether the second device is within a threshold distance of the first device; and
in response to determining that the second device is within the threshold distance, establishing, by the first device, the secure communication channel.

5. The method of claim 4, further comprising:
in response to connecting to the second device, starting, by the first device, a timer; and
in response to determining that the second device is not within the threshold distance of the first device before the timer reaches a timeout value, disconnecting, by the first device, the direct wireless connection to the second device.

6. The method of claim 1, wherein the received message is encrypted and the method further comprises decrypting the message.

7. The method of claim 1, further comprising:
establishing, by the first device, a particular type of relationship with the second device;
storing, by the first device, the second device-identifying information in association with an indication of the particular type of relationship established with the second device; and
transmitting, by the first device, to the second device, and over the secure communication channel, the indication of the particular type of relationship established with the second device.

8. The method of claim 7, wherein establishing, by the first device, the particular type of relationship with the second device comprises:
displaying, by the first device, one or more types of relationships between users;
receiving, by the first device, a selection of one of the one or more types of relationships, the selected type of relationship corresponding to the particular type of relationship between the first user and the second user; and
establishing, by the first device, the particular type of relationship based on the selected type of relationship.

9. The method of claim 7, further comprising:
in response to transmitting, to the second device, the indication of the particular type of relationship established with the second device, disconnecting, by the first device, a direct wireless connection to the second device.

10. A device, comprising:
a memory; and
at least one processor configured to:
establish a secure communication channel with another device, the device being associated with a user account and the other device being associated with another user account that differs from the user account;
transmit over the secure communication channel, device-identifying information to the other device, and receive, over the secure communication channel, other device-identifying information from the other device, the device-identifying information being uniquely associated with the device and the other device-identifying information being uniquely associated with the other device;
store the other device-identifying information in association with an indication of a particular type of relationship established with the other device;
transmit over the secure communication channel, the indication of the particular type of relationship to the other device;
receive a message, wherein the message includes device-identifying information corresponding to the other device;
verify that the particular type of relationship was established with the other device based at least in part on comparing the device-identifying information included in the received message to the device-identifying information received from the other device over the secure communication channel; and
in response to verification that the particular type of relationship was established with the other device, display at least a portion of the message.

11. The device of claim 10, wherein the at least one processor is further configured to:
connect to the other device via a direct wireless connection;
when connected to the other device via the direct wireless connection, determine whether the other device is within a threshold distance of the device; and
when the other device is within the threshold distance, establish the secure communication channel.

12. The device of claim 11, wherein the at least one processor is further configured to:
after transmission of the indication of the particular type of relationship to the other device, disconnect the direct wireless connection to the other device while the other device is within the threshold distance.

13. The device of claim 11, wherein the at least one processor is further configured to:
in response to connecting to the other device, start a timer; and
in response to determining that the other device is not within the threshold distance before the timer reaches a timeout value, disconnect the direct wireless connection to the other device.

14. The device of claim 10, wherein the at least one processor is further configured to:
transmit, over the secure communication channel, a first public key to the other device, and receive, over the secure communication channel, a second public key from the other device.

15. The device of claim 10, wherein the at least one processor is further configured to:
display one or more types of relationships between users;
receive a selection of one of the one or more types of relationships, the selected type of relationship corresponding to the type of relationship between the user and the other user; and
establishing the particular type of relationship based on the selected type of relationship.

16. The device of claim 10, wherein the received message is encrypted and the at least one processor is further configured to decrypt the message.

17. A non-transitory machine-readable medium comprising code that, when executed by one or more processors, causes the one or more processors to perform operations, the code comprising:
- code to transmit, by a first device, first device-identifying information to a second device, and to receive, by the first device, second device-identifying information from the second device;
- code to receive, a message from the second device, wherein the message comprises device-identifying information corresponding to the second device;
- code to verify, by the first device, the message based at least in part on a comparison of the device-identifying information included in the message with the second device-identifying information received from the second device; and
- code to, in response to verification of the message, cause at least a portion of the message to be displayed on the first device.

18. The non-transitory machine-readable medium of claim 17, wherein the code further comprises:
- code to transmit, by the first device, a first public key to the second device, and to receive, by the first device, a second public key from the second device.

19. The non-transitory machine-readable medium of claim 18, wherein the received messages is encrypted and the code further comprises:
- code to decrypt the message based at least in part on the second public key.

20. The non-transitory machine-readable medium of claim 17, wherein the first device-identifying information comprises a first token and the second device-identifying information comprises a second token.

21. The method of claim 1, wherein the message is received over a different communication channel than the secure communication channel.

* * * * *